(12) United States Patent
Fargano et al.

(10) Patent No.: US 7,035,619 B1
(45) Date of Patent: *Apr. 25, 2006

(54) SYSTEM AND METHOD FOR INTEGRATING CALL DETAIL RECORDS FOR A MULTIPLE NETWORK ENVIRONMENT

(75) Inventors: Michael J. Fargano, Louisville, CO (US); David C. Hill, Arvada, CO (US); Patrick J. Richardson, Aurora, CO (US); Robert Duncan, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 830 days.

This patent is subject to a terminal disclaimer.

(21) Appl. No.: 09/295,288

(22) Filed: Apr. 20, 1999

(51) Int. Cl.
*H04Q 7/20* (2006.01)

(52) U.S. Cl. .................... 455/406; 455/405; 379/126; 379/133

(58) Field of Classification Search ............... 455/405, 455/406, 407, 408, 409, 414, 426, 428, 432; 379/111, 113, 112, 114, 115, 121, 127, 112.01, 379/114.01, 114.03, 114.28, 115.01, 115.02, 379/120, 121.01, 121.03, 126, 133, 134
See application file for complete search history.

(56) References Cited

U.S. PATENT DOCUMENTS 5,991,616 A * 11/1999 Mirza et al. ................ 455/406
6,091,944 A * 7/2000 Friend ........................ 455/409

* cited by examiner

*Primary Examiner*—Nay Maung
*Assistant Examiner*—Philip J. Sobutka
(74) *Attorney, Agent, or Firm*—Brooks Kushman P.C.

(57) ABSTRACT

A system and method for integrating call detail records for a multiple network environment includes an operations support system having call detail record control logic configured to combine wireless and wireline call detail records that correspond to the same customer into an integrated call record. Access manager control logic connected to the wireless network and switching control logic connected to the wireline network generate wireless and wireline call detail records that are received at the operations support system. Advantageously, combining the wireless and wireline call detail records forms an integrated call record.

20 Claims, 2 Drawing Sheets

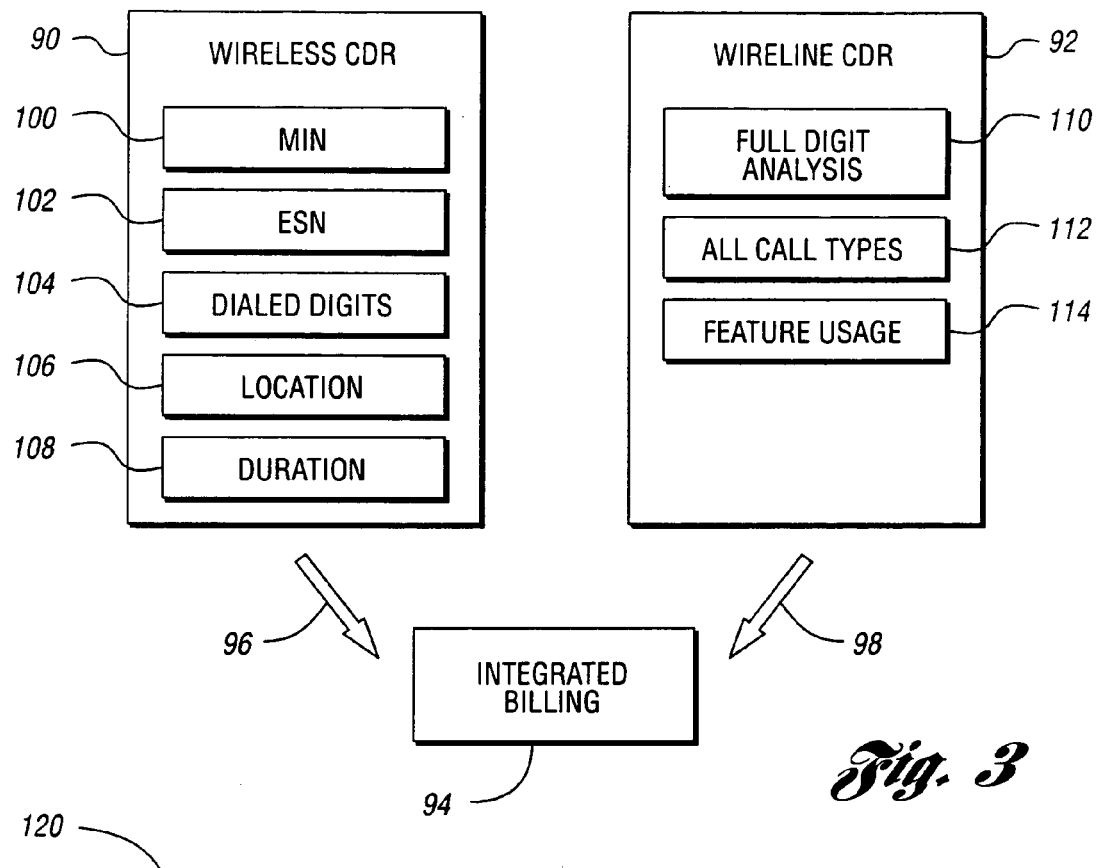
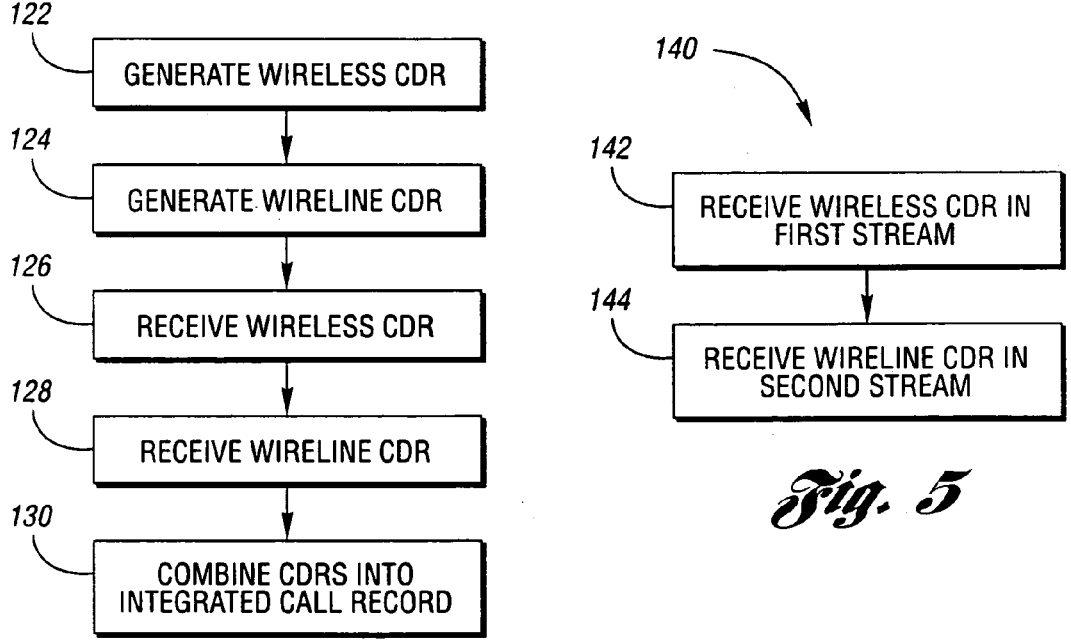
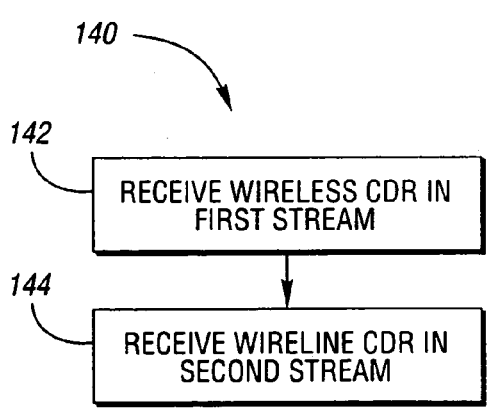

SYSTEM AND METHOD FOR INTEGRATING CALL DETAIL RECORDS FOR A MULTIPLE NETWORK ENVIRONMENT

TECHNICAL FIELD

The present invention relates to systems and methods for integrating call detail records for a multiple network environment.

BACKGROUND ART

The primary elements of an existing wireline intelligent network are a switching system, a signaling network, a centralized database, and an operations support system which supports the database. In general, the switching system intercepts a call from a call source, and suspends call processing while launching a query through the signaling network to the centralized database. The database, in turn, retrieves the necessary information to handle the call, and returns that information through the signaling network to the network switch, which may be a local digital switch, so that the call can be completed. The operations support system administers the appropriate network and customer information, including wireline call detail records.

The intelligence of the intelligent network is found at the service control points. A service control point is an on-line, real-time, fault-tolerant, transaction-processing database which provides call-handling information in response to network queries. The signaling network is made up of signal transfer points. A signal transfer point is a packet switch found in the common-channel signaling network. The signal transfer point is used to route signaling messages between network access nodes, such as switches and service control points. Signaling System 7 is a common communications protocol used in common-channel signaling networks.

In addition to the existing wireline application intelligent networks that have been in use for many years, wireless application network systems have become widespread. Unfortunately, wireless application networks sometimes fail to take advantage of existing network architecture, but instead employ a separate wireless application network including separate full call detail records. As such, customers that subscribe to wireless services in addition to wireline services are faced with separate service bills for their wireless and wireline subscriptions.

For the foregoing reasons, there is a need for a system and method that reduces the burden placed on the end customer by the separate and sometimes confusing customer billing statements.

DISCLOSURE OF INVENTION

It is therefore an object of the present invention to provide a system and method for integrating call detail records in an integrated wireless/wireline network, that is capable of combining wireless and wireline call detail records that correspond to the same customer into an integrated call record.

In carrying out the above object, a system for integrating call detail records for a multiple network environment is provided. The system comprises access manager control logic, switching control logic, and an operations support system. The access manager control logic is connected to a wireless network, and is configured to generate a wireless call detail record in response to placement of a wireless call from a call source having an identity. The switching control logic is connected to a wireline network; and, the switching control logic is configured to generate a wireline call detail record. The operations support system has call detail record control logic. The call detail record control logic is configured to receive the wireless call detail record from the access manager control logic and to receive the wireline call detail record from the switching control logic. Further, the call detail record control logic is configured to combine to wireless and wireline call detail records that correspond to the same customer into an integrated call record.

Preferably, the operations support system receives the wireless call detail record from the access manager in a first call detail record stream, and receives the wireline call detail record from the switching control logic in a second call detail stream. Alternatively, the access manager sends the wireless call detail record over a signaling network to the switching control logic; and, the operations support system receives the wireless call detail record and the wireline call detail record from the switching control logic in a combined call detail stream.

In a preferred embodiment, the system for integrating call detail records further comprises a wireless customer care center configured to communicate with the operations support system to retrieve at least part of the integrated call record on demand. Further, the wireless call detail record preferably includes at least one item from the group consisting of: a mobile identification number, an electronic serial number, dialed digits from the call source, a call source location, and a call duration. Further, the wireline call detail record preferably includes a full call analysis including call routing information. Still further, the wireline call detail record preferably includes feature usage information corresponding to the customer.

Further, in carrying out the present invention, a method for integrating call detail records in a multiple network environment is provided. The method comprises generating a wireless call detail record, generating a wireline call detail record, receiving the wireless call detail record and the wireline call detail record at the operations support system, and combining wireless and wireline call detail records corresponding to the same customer into an integrated call record. The wireless call detail record is generated at access manager control logic connected to a wireless network. The wireline call detail record is generated at switching control logic connected to a wireline network.

Still further, in carrying out the present invention, a multiple network system for integrating call detail records comprises a wireless network, access manager control logic, a wireline network, switching control logic, and an operations support system having call detail record control logic configured to combine wireless and wireline call detail records that correspond to the same customer into an integrated call record. Preferably, the wireless call detail record is received from the access manager control logic in a first call detail record stream, and the wireline call detail record is received from the switching control logic in a second call detail stream.

The advantages associated with embodiments of the present invention are numerous. For example, systems and methods of the present invention for integrating call detail records in a multiple network environment can combine wireless and wireline call detail records that correspond to the same customer into an integrated call record. As such, embodiments of the present invention are particularly useful in a combined network that is utilized for both wireline and wireless applications.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 is a diagram illustrating examples of information that may be contained in the wireless and wireline call detail records, and then combined into an integrated bill;

FIG. 4 is a block diagram illustrating a method of the present invention for integrating call detail records in a multiple network environment; and FIG. 5 is a block diagram illustrating a preferred method of the present invention for receiving the wireless and wireline call detail records in separate logical flows to the operations support system.

BEST MODES FOR CARRYING OUT THE INVENTION

Figure 1:
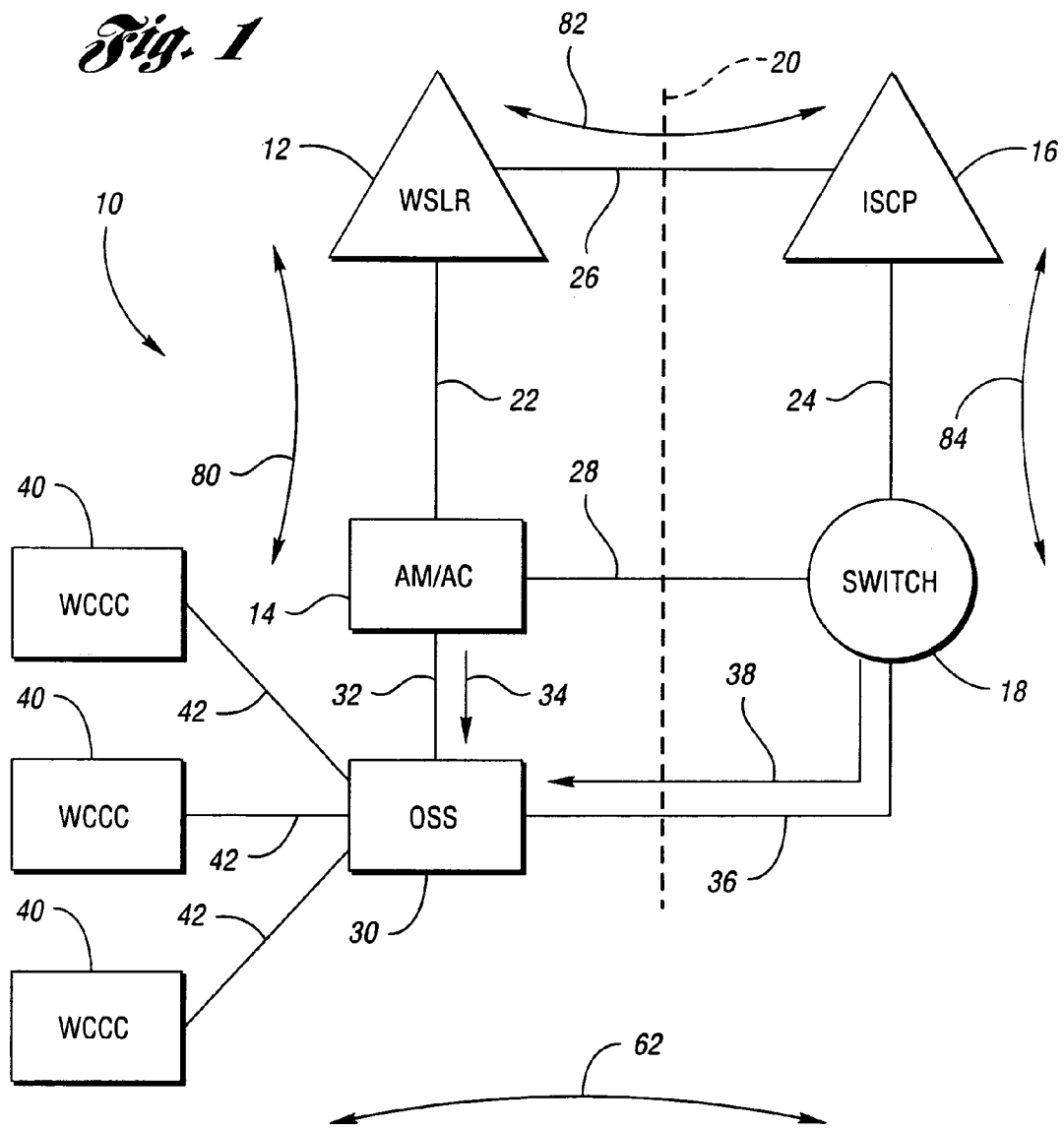
FIG. 1 is a diagram illustrating a system of the present invention for integrating call detail records in a multiple network environment.

With reference to FIG. 1, a system of the present invention for integrating call detail records in a multiple network environment is generally indicated at 10. System 10 includes a network that provides service for both wireline applications and wireless applications. The wireless application network portion includes a service location register such as Wireless service location register 12 and an access manager/access controller 14. Access manager control logic is performed by access manager 14. The wireline network portion of system 10 includes an integrated service control point 16 and a switch 18, as shown. Switching control logic is performed at switch 18. Dashed line 20 separates the wireless and wireline sides of the network, and helps give a better appreciation of the advantages of embodiments of the present invention. Namely, embodiments of the present invention provide a way for an integrated wireline and wireless network to provide for integrated accounting management. Separate wireline and wireless call detail records are collected, processed, and combined (as appropriate) for the purpose of customer care and billing. Preferably, the present invention is implemented with Personal Communications System Access Network (PCSAN) or Generic-C architecture wherein the wireless side of the network has some necessary information for customer care and wireless billing (for example, air time and location); and, the wireline side of the network has complete information for customer wireline billing (for example, feature usage and toll call information).

As PCSAN is an innovative architecture that combines wireless and wireline networks, embodiments of the present invention advantageously provide integrated systems and methods for integrating call detail records in such combined networks. Advantageously, a combined wireline and wireless network is cost-effective in that intelligent (and expensive) portions of the network may be shared by wireline and wireless applications, preventing the need to duplicate costly systems.

With continuing reference to FIG. 1, WSLR 12 is connected to access manager 14 by link 22, while integrated service control point 16 is connected to switch 18 by link 24. Further, WSLR 12 is connected to integrated service control point 16 by link 26; and, access manager 14 is connected to switch 28 by interface 28. A suitable signaling protocol for the integrated wireline and wireless network is Signaling System 7. Further, a suitable interface 28 for connecting access manager 14 to switch 18 is a TR-303, GR-303, or equivalent interface.

An operations support system 30 is connected to access manager 14 by link 32, and is connected to switch 18 by link 36. Of course, there may be multiple operations support systems. In accordance with the present invention, wireless call detail records are received from access manager 14 at operations support system 30 in a first stream as indicated by arrow 34. Further, in accordance with the present invention, wireline call detail records are received at operations support system 30 from switch 18 in a second stream as indicated by arrow 38.

Operations support system 30 initiates appropriate call detail record control logic to combine wireless and wireline call detail records that correspond to the same customer into an integrated call record. Preferably, a plurality of wireless customer care centers 40 are connected by links 42 to operations support system 30. Accordingly, wireless customer care centers 40 are configured to communicate with operations support system 30 to retrieve at least part of the integrated call record on demand. That is, operations support system 30 combines the "simple" data in the wireless call detail record with the detailed information from the wireline side of the network to provide an innovative and useful combined call detail record. The advantages accruing to the use of a combined call detail record in accordance with the present invention are numerous. For example, a wireless device customer may place a call to one of the wireless customer care centers, with questions about either wireless or wireline call services. As such, the representative at the customer care center has access to both wireless and wireline call detail record information in a single integrated call detail record.

Preferably, and as shown in FIG. 1, the wireless call detail record from access manager 14 is received in a first call detail record stream 34, and the wireline call detail record is received from switch 18 in a second stream 38. The first and second streams are logical flows, and it is to be appreciated that a point-to-point connection is not being implied here.

Figure 2:
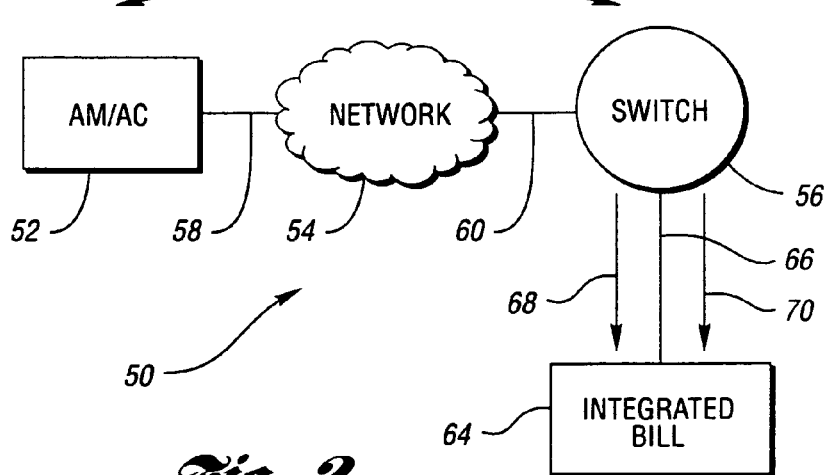
FIG. 2 is an alternative embodiment of the present invention.

As best shown in FIG. 2, alternatively, a single stream may be utilized. Of course, at this time, the inventors prefer that two separate streams be used, but alternatively a single stream may be used, possibly as an interim solution. In FIG. 2, system 50 includes access manager 52 communicating through network 54 to switch 56. Access manager 52 is connected by link 58 to network 54 which is connected by link 60 to switch 56. As indicated by arrow 62, wireless call detail records are sent over network 54 to switch 56. Thereafter, an integrated bill 64 may be created by combining wireless and wireline call detail records sent in a single stream. As shown, integrated bill block 64 is connected to switch 56 by link 66, and wireless and wireline call detail records are shown being sent to integrated bill block 64 by arrows 68 and 70. Network 54 may take many forms such as, for example, network 54 may be the signaling network illustrated in FIG. 1. That is, the wireless call detail record may be sent over the signaling network along arrows 80, 82, 84 to switch 18 (FIG. 1), and then sent to Operations Support System (OSS) 30.

With reference to FIG. 3, preferred implementations for the wireless call detail record and wireline call detail record are illustrated, with a wireless call detail record indicated at 90 and a wireline call detail record indicated at 92. Wireless call detail record 90 preferably includes simple information that preferably relates to a call as the call is placed, and information that is available in real-time at the customer care center. That is, the information in the wireless call detail record is obtained immediately when a wireless call is placed, and it is then almost immediately available at the wireless customer care center in the event that a customer calls the care center with questions about their call. As shown, wireless call detail record 90 preferably includes mobile identification number 100 (for example, the phone number), electronic serial number 102, dial digits for the current call 104, location of the call source 106, and duration of the call 108.

Further, wireline call detail record 92 preferably includes full digit analysis 110, detailed information on all types of calls 112, and feature usage information 114 for any features that a customer subscribes to. That is, the information contained in wireline call detail record 92 is very detailed and very complete because this information must be sufficient to generate a wireline billing record. As such, the wireless call detail record may contain only a limited amount of information, and then advantageously in accordance with the present invention be combined with the wireline call detail record to provide a combined integrated bill 94. The combining of wireless call detail record 90 and wireline call detail record 92 is graphically illustrated by arrows 96 and 98.

It is to be appreciated that the interface between the wireline switch and the operations support system (as well as other interfaces) may take a variety of forms as appreciated by one skilled in the art. For example, when the interface between the wireline switch and the operations support system is an interface between two different companies, exchange message interface (EMI) is a preferred format for messaging. Further, for example, when the interface between the wireline switch and the operations support system is internal to a single company, automatic message accounting (AMA) is a preferred format for messaging. Of course, one of ordinary skill in the art appreciates that many of the different links and interfaces involved in a wireline and wireless combined network may take many forms.

With reference to FIG. 4, a method of the present invention for integrating call detail records in a multiple network environment is generally indicated at 120. At block 122, a wireless call detail record is generated. The wireless call detail record is generated in response to placement of a wireless call from a call source having an identity. The identity may be, for example, a mobile identification number and/or an electronic serial number. The wireless call detail record is generated at access manager control logic connected to the wireless side of the network. Preferably, the access manager control logic is located within access manager 14 (FIG. 1). At block 124, a wireline call detail record is generated at the switching control logic. Preferably, the switching control logic is located at the local switch 18 (FIG. 1). The switch is connected to the wireline side of the network. In a preferred implementation of the present invention the wireline and wireless sides of the network, as best shown in FIG. 1, are connected by the signaling system (link 26) and by the call interface 28 (suitably a TR-303, GR-303, or equivalent interface).

At block 126, the wireless call detail record is received from the access manager control logic at the operations support system. At block 28, the wireline call detail record is received from the switching control logic at the operations support system. At block 130, wireless and wireline call detail records corresponding to the same customer are combined into an integrated call record.

With reference to FIG. 5, in a preferred embodiment of the present invention the wireless call detail record is sent in a first stream (block 142) and the wireline call detail record is sent in a second stream (block 144). The first and second separated streams (logical flows) are best shown in FIG. 1 by arrows 34 and 38. Of course, this is preferred, but alternatively a single stream may be utilized as best shown in FIG. 2.

Advantageously, embodiments of the present invention reuse wireline network services, that is, the features and billing services located in the wireline call detail record. Further, embodiments of the present invention are advantageous in that the present invention facilitates handling of a majority of wireless customer care center calls. For example, many wireless customer care center calls relate to call credit, trouble resolution, air time ratings, inquiries about pre-paid calling, and roaming information. As much of this information exists in the wireline call detail record as opposed to the "simple" wireless call detail record, embodiments of the present invention are advantageous in that the combined call detail record contains all necessary information for the service representative to handle the call, resulting in better overall service from the WCCC. Further, although separate stream or single stream embodiments of the present invention may be implemented, it is preferred that the dual stream embodiments are employed. As such, the single stream embodiment may serve as an interim solution, and a suitable switch for such an implementation is any Class 5 switch that supports the appropriate interface.

While the best mode for carrying out the invention has been described in detail, those familiar with the art to which this invention relates will recognize various alternative designs and embodiments for practicing the invention as defined by the following claims.

What is claimed is:

1. A system for integrating call detail records for a multiple network environment, the system comprising:
   access manager control logic connected to a wireless network, the access manager control logic being configured to generate a wireless call detail record in response to placement of a wireless call from a call source having an identity;
   switching control logic connected to a wireline network, the switching control logic being configured to generate a wireline call detail record; and
   an operations support system having call detail record control logic configured to receive the wireless call detail record form the access manager control logic, to receive the wireline call detail record from the switching control logic, and to combine wireless and wireline call detail records that correspond to the same customer into an integrated call record.

2. The system of claim 1 wherein the operations support system receives the wireless call detail record from the access manager control logic in a first call detail record stream, and the operations support system receives the wireline call detail record from the switching control logic in a second call detail stream.

3. The system of claim 1 wherein the access manager control logic sends the wireless call detail record over a signaling network to the switching control logic, and wherein the operations support system receives the wireless call detail record and the wireline call detail record from the switching control logic in a combined call detail stream.

4. The system of claim 1 further comprising:
a wireless customer care center configured to communicate with the operations support system to retrieve at least part of the integrated call record on demand.

5. The system of claim 1 wherein the wireless call detail record includes a mobile identification number.

6. The system of claim 1 wherein the wireless call detail record includes an electronic serial number.

7. The system of claim 1 wherein digits are dialed at the call source, and the wireless call detail record includes the dialed digits.

8. The system of claim 1 wherein the call source has a corresponding location, and wherein the wireless call detail record includes the call source location.

9. The system of claim 1 wherein the call has a duration, and wherein the wireless call detail record includes the call duration.

10. The system of claim 1 wherein the wireline call detail record includes a full call analysis including call routing information.

11. The system of claim 1 wherein the wireline call detail record includes feature usage information corresponding to the customer.

12. A method for integrating call detail records for a multiple network environment, the method comprising:
generating a wireless call detail record in response to placement of a wireless call from a call source having an identity, the wireless call detail record being generated at access manager control logic connected to a wireless network;
generating a wireline call detail record at switching control logic connected to a wireline network;
receiving the wireless call detail record from the access manager control logic at an operations support system;
receiving the wireline call detail record from the switching control logic at the operations support system; and
combining wireless and wireline call detail records corresponding to the same customer into an integrated call record.

13. The method of claim 12 wherein receiving the wireless call detail record and receiving the wireline call detail record further comprise:
receiving the wireless call detail record from the access manager control logic in a first call detail record stream; and
receiving the wireline call detail record from the switching control logic in a second call detail stream.

14. The method of claim 12 wherein receiving the wireless call detail record and receiving the wireline call detail record further comprise:
sending the wireless call detail record from the access manager control logic over a signaling network to the switching control logic; and
receiving the wireless call detail record and the wireline call detail record from the switching control logic in a combined call detail stream.

15. The method of claim 12 further comprising:
configuring a wireless customer care center to communicate with the operations support system to retrieve at least part of the integrated call record on demand.

16. The method of claim 12 wherein the wireless call detail record includes at least one item from the group consisting of: a mobile identification number, an electronic serial number, dialed digits from the call source, a call source location, and a call duration.

17. The method of claim 12 wherein the wireline call detail record includes a full call analysis including call routing information.

18. The method of claim 12 wherein the wireline call detail record includes feature usage information corresponding to the customer.

19. A multiple network system for integrating call detail records, the system comprising:
a wireless network;
access manager control logic connected to the wireless network, the access manager control logic being configured to generate a wireless call detail record in response to placement of a wireless call from a call source having an identity;
a wireline network in communication with the wireless network through a control interface;
switching control logic connected to the wireline network, the switching control logic being configured to generate a wireline call detail record; and
an operations support system having call detail record control logic configured to receive the wireless call detail record form the access manager control logic, to receive the wireline call detail record from the switching control logic, and to combine wireless and wireline call detail records that correspond to the same customer into an integrated call record.

20. The system of claim 19 wherein the operations support system receives the wireless call detail record from the access manager control logic in a first call detail record stream, and the operations support system receives the wireline call detail record from the switching control logic in a second call detail stream.

* * * * *